(12) United States Patent
Hummel et al.

(10) Patent No.: US 8,387,950 B2
(45) Date of Patent: Mar. 5, 2013

(54) FLOW DEVICE AND METHOD AND SYSTEM USING THE FLOW DEVICE

(75) Inventors: Daniel Scott Hummel, West Chester, OH (US); Daniel Jean-Louis Laborie, West Chester, OH (US); Bradley James Holtsclaw, Springboro, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/080,864

(22) Filed: Apr. 6, 2011

(65) Prior Publication Data

US 2012/0255274 A1   Oct. 11, 2012

(51) Int. Cl.
  *F16K 3/00*   (2006.01)
(52) U.S. Cl. ......... 251/212; 60/779; 60/39.091; 60/782; 60/785; 60/39.093; 138/45; 244/134 A; 244/134 B; 244/134 C; 137/68.11
(58) Field of Classification Search ............ 60/779, 60/39.091, 782, 785, 39.093; 138/45; 244/134, 244/134 B, 134 C; 251/212; 137/68.11
See application file for complete search history.

(56) References Cited

U.S. PATENT DOCUMENTS

| | | | |
|---|---|---|---|
| 2,593,315 A * | 4/1952 | Kraft | 138/45 |
| 3,571,977 A | 3/1971 | Abeel | |
| 4,688,745 A * | 8/1987 | Rosenthal | 244/134 R |
| 5,351,476 A | 10/1994 | Laborie et al. | |
| 6,035,896 A | 3/2000 | Liardet | |
| 7,275,560 B2 | 10/2007 | Rogge | |
| 7,740,075 B2 | 6/2010 | Goughnour et al. | |
| 8,167,002 B2 * | 5/2012 | Kuhne et al. | 138/45 |
| 2002/0179773 A1 | 12/2002 | Breer et al. | |
| 2005/0016595 A1 | 1/2005 | Maeda et al. | |

FOREIGN PATENT DOCUMENTS

| | | |
|---|---|---|
| EP | 0560612 A1 | 9/1993 |
| WO | 9709552 A1 | 3/1997 |

OTHER PUBLICATIONS

EP Search Report and Written Opinion dated Jul. 27, 2012 from corresponding EP Application No. 12163280.6.

* cited by examiner

*Primary Examiner* — William H Rodriguez
*Assistant Examiner* — Craig Kim
(74) *Attorney, Agent, or Firm* — General Electric Company; William Scott Andes; David J. Clement

(57) ABSTRACT

A flow device adapted to operate as a restrictor as well as provide a pressure relief capability in the event of an over-pressurization event within a fluid system containing the device. The flow device includes an expandable orifice that has an outer perimeter, a plurality of cantilevered tabs surrounded by the outer perimeter, and an opening surrounded and defined by the tabs. The tabs project from the outer perimeter toward the opening, which restricts flow of the bleed air through the expandable orifice at a pressure below a predetermined pressure level, but then expands to relieve an over-pressure condition of the bleed air at a pressure above the predetermined pressure level as a result of the cantilevered tabs being deflected by the over-pressure condition. The device is adaptable for use in aircraft applications, including the regulation of bleed air used in anti-icing/de-icing systems.

18 Claims, 2 Drawing Sheets

FLOW DEVICE AND METHOD AND SYSTEM USING THE FLOW DEVICE

BACKGROUND OF THE INVENTION

The present invention generally relates to flow devices used in a fluid system, and more particularly to a flow device that is adapted to restrict flow of a fluid within a system and further capable of responding to an over-pressure condition in the system.

As known in the art, a portion of the air compressed by the fan and/or compressor of a gas turbine engine is typically used for various purposes, including cooling of engine components and, in the case of aircraft engines, use in anti-icing and de-icing systems and cabin pressurization. For illustrative purposes, FIG. 1 schematically represents a high-bypass turbofan engine 10 as including a large fan 12 placed at the front of the engine 10 to compress incoming air 14. The bulk of this compressed air is ducted toward the rear of the engine 10 to increase thrust and reduce the specific fuel consumption of the engine 10, while a smaller portion of the air enters a core engine (gas turbine) 16. The core engine 16 is represented as including a compressor section 18 containing low and high pressure compressor stages that further compress the air, a combustion chamber 20 where fuel is mixed with the compressed air and combusted, and a turbine section 22 where high and low pressure turbines extract energy from the combustion gases to drive, respectively, the high pressure stage of the compressor section 18 and the fan 12 and low pressure stage of the compressor section 18. The fan 12 is surrounded by a nacelle or fan cowling 24 that, in combination with a core cowling 26 surrounding the core engine 16, defines a bypass duct 28 through which the bulk of the compressed fan air flows toward the rear of the engine 10.

FIG. 1 schematically represents bleed air flow that is drawn from the compressor section 18 and delivered through a duct 32 to an annular-shaped cavity 34, sometimes referred to as the D-duct, defined between the inlet lip 36 of the fan cowling 24 and a bulkhead 38 within the fan cowling 24. The hot bleed air can be discharged through a plenum 40 (as represented in FIG. 1) toward the internal surfaces the inlet lip 36, resulting in heating of the lip 36 to remove and/or prevent ice formation. The spent bleed air then exits the D-duct 34 through, for example, one or more vents (not shown). As previously noted, compressed air from the compressor section 18 as well as the fan 12 can be bled for various other purposes and therefore used by various other regions of the engine 10. For example, bleed air from the fan bypass duct 28 is often ducted to the core compartment 30 within the core cowling 26 to cool the engine control and various other components (not shown) located within the compartment 30. As such, the location and configuration of the duct 32 is a nonlimiting example of a duct intended to deliver bleed air within an aircraft engine.

Depending on its end use, air bled from the fan 12 or compressor section 18 may require pressure or flow regulation, such as with a valve or a bleed orifice. For example, the plenum 40 represented in FIG. 1 may be configured as a manifold or one of multiple nozzles (not shown) to serve as a flow restrictor to control the flow rate of bleed air to the D-duct 34. In addition, provisions may be required to ensure that the bleed air does not exceed some pressure limit, for example, the structural capability of the fan cowling 24. For this purpose, various types of pressure relief valves and "blowout" doors have been developed and used. For example, U.S. Pat. No. 3,571,977 discloses a pressure release door to prevent the over-pressurization of a pressurized compartment, such as within a nacelle of an aircraft engine to prevent the failure of skin panels and other major structural components of the nacelle if an over-pressurization event were to occur. While effective for their intended purpose, blowout doors and pressure relief valves add complexity and weight to an aircraft engine, all of which is detrimental to the cost and operation of the aircraft.

BRIEF DESCRIPTION OF THE INVENTION

The present invention provides a flow device adapted to operate as a restrictor as well as provide a pressure relief capability in the event of an over-pressurization event within a fluid system containing the device. The device is adaptable for use in aircraft applications, including the regulation of bleed air used in anti-icing/de-icing systems, cabin pressurization, and component cooling systems.

According to a first aspect of the invention, the flow device includes a panel having a thickness in a through-thickness direction of the panel, and an expandable orifice defined in the panel. The expandable orifice has an outer perimeter, a plurality of cantilevered tabs surrounded by the outer perimeter and lying in a plane, and an opening that extends through the thickness of the panel and is surrounded and defined by the cantilevered tabs. The cantilevered tabs project from the outer perimeter toward the opening. Adjacent pairs of the cantilevered tabs are separated from each other by a gap, so that the cantilevered tabs are able to deflect out of the plane thereof independently of each other. Each cantilevered tab defines a junction at the outer perimeter at which the cantilevered tab bends when deflected out of the plane thereof. The opening is operable to restrict a fluid flowing through the expandable orifice at a pressure below a predetermined pressure level, and the cantilevered tabs are operable to deflect out of the plane thereof to relieve an over-pressure condition of the fluid at a pressure above the predetermined pressure level.

Other aspects of the invention include fluid systems that contain the flow device, for example, anti-icing systems of aircraft engines, as well as methods of using a flow device to regulate the flow of a fluid through a fluid system and provide a pressure relief effect within the system. As a particular example, for the purpose of inhibiting ice build-up on a fan cowling of an aircraft engine, such a method includes operating the aircraft engine, drawing bleed air from a compressor of the aircraft engine, and introducing the bleed air into the fan cowling through a flow device comprising an expandable orifice that has an outer perimeter, a plurality of cantilevered tabs surrounded by the outer perimeter, and an opening surrounded and defined by the cantilevered tabs. The cantilevered tabs project from the outer perimeter toward the opening, which restricts flow of the bleed air through the expandable orifice at a pressure below a predetermined pressure level. If the cantilevered tabs deflect in response to an over-pressure condition of the bleed air at a pressure above the predetermined pressure level, the opening expands as the tabs deflect to relieve the over-pressure condition.

A technical effect of this invention the ability of the flow device to function in a largely conventional manner as a flow restrictor within a flowing fluid system, as well as provide a pressure relief function in the event that a predetermined pressure level is exceeded within the fluid system. In addition, the flow device can be implemented without significantly increasing the complexity or weight of the fluid system. The flow device can also be implemented with fewer components than conventional pressure relief devices, including pressure relief valves and blowout doors commonly used in aircraft applications.

DETAILED DESCRIPTION OF THE INVENTION

Figure 1:
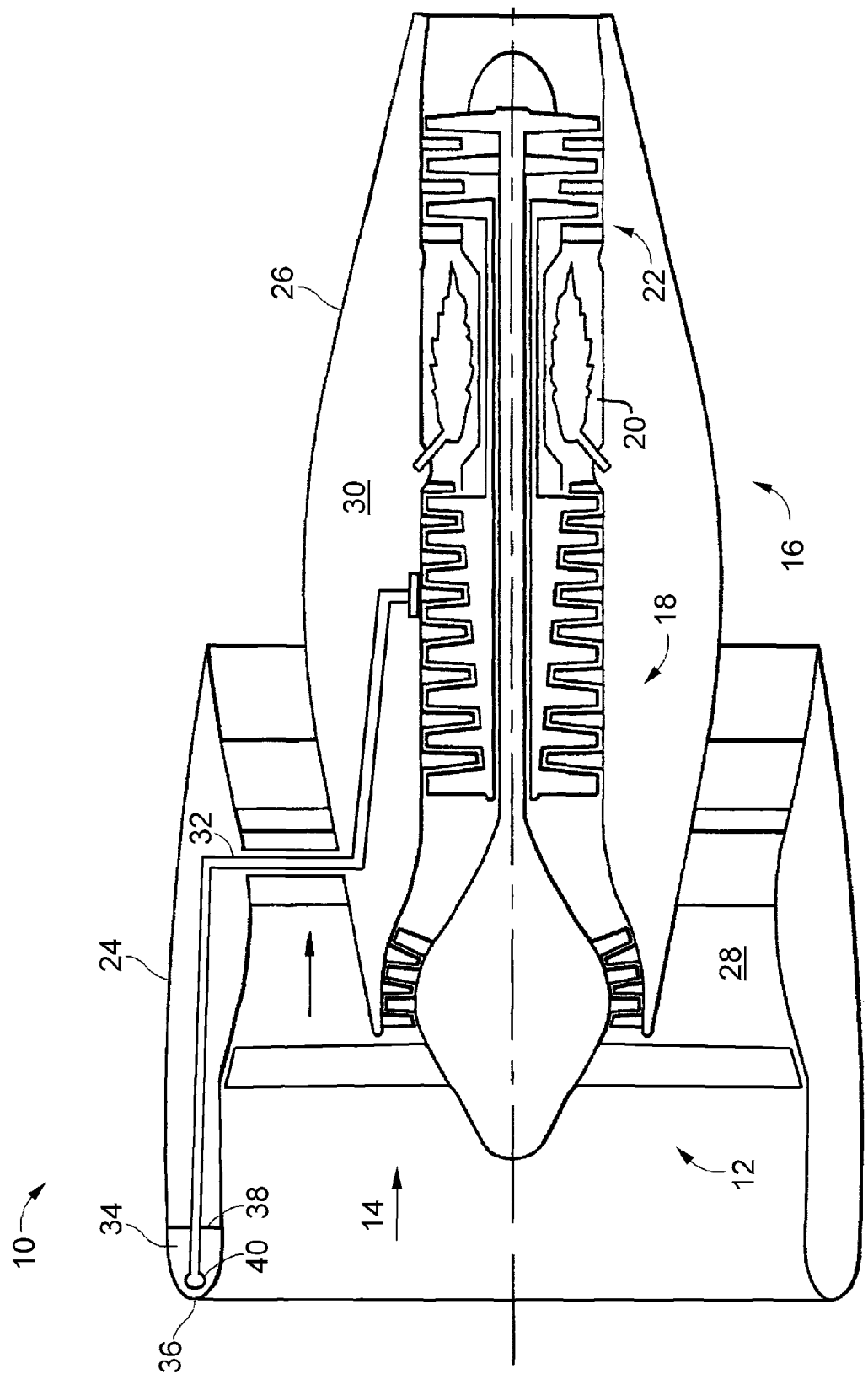
FIG. 1 schematically represents a cross-sectional view of a high-bypass turbofan engine.
Figure 2:
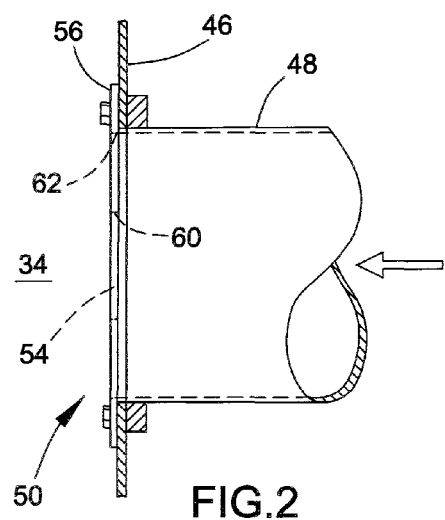
FIG. 2 schematically represents a side view of a flow passage and wall to which a flow device is mounted for regulating fluid flow through the wall.
Figure 3:
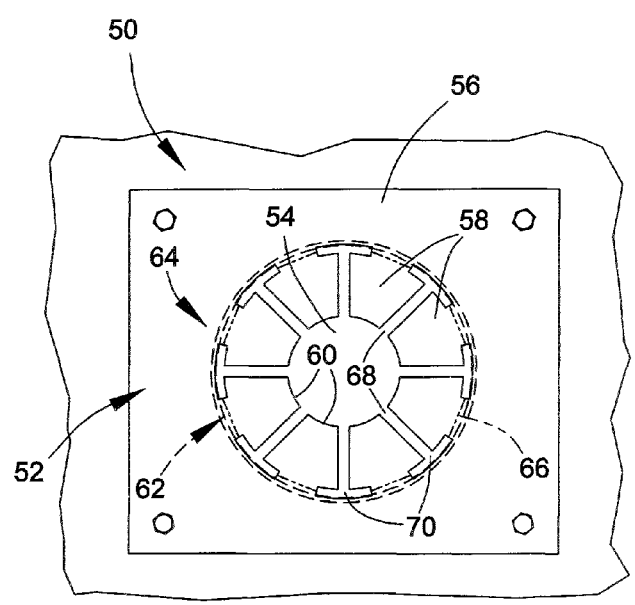
FIG. 3 is a plan view of the flow device of FIG. 2, and represents the flow device as defining an expandable orifice in accordance with an embodiment of the invention.
Figure 4:
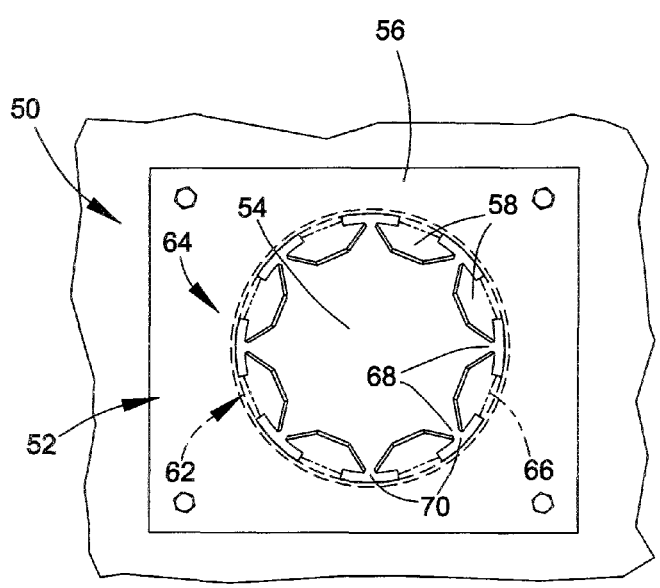
FIG. 4 is a perspective view showing tabs of the flow device of FIG. 3 deflected out-of-plane in response to an over-pressurization event.

FIGS. 2 through 4 schematically represent a flow device 50 according to an embodiment of the present invention. The flow device 50 can be employed in an anti-icing (and de-icing) system of the type represented in FIG. 1, and for convenience will be discussed with reference to the engine 10 in FIG. 1. However, the invention is suitable for use in a variety of other applications in which flow restriction of a fluid is desired as well as protection from over-pressurization conditions, including but not limited to bleed air drawn from the compressor 18 or bypass duct 28 for use by various other regions of the engine 10.

FIG. 2 schematically represents the flow device 50 as mounted to a wall 46 and receiving bleed air from a passage 48. For example, the wall 46 may be a wall of the plenum 40 in FIG. 1 and the passage 48 may be the duct 32 of FIG. 1, in which case the device 50 operates as a component of the anti-icing system of FIG. 1. As such, bleed air drawn from the compressor section 18 is discharged through the device 50 into the D-duct (cavity) 34, resulting in the inlet lip 36 (not shown) being heated to remove and/or prevent ice formation on the fan cowling 24 and, more particularly, the inlet lip 36 of the cowling 24. The bleed air discharged into the D-duct 34 may require pressure or flow regulation, and for this purpose the flow device 50 is configured to serve as one of any number of flow restrictors that control the flow rate of hot bleed air discharged into the D-duct 34. In addition to its flow restrictor function, the flow device 50 is configured to have a pressure relief function to prevent an over-pressurization condition within the duct 32 or plenum 40.

In the embodiment represented in FIGS. 2, 3 and 4, the flow device 50 is in the form of a flat panel 52 in which an opening 54 is defined. The panel 52 can be formed of a variety of materials, with stainless steels being notable but nonlimiting examples. The panel 52 is preferably flat as shown, though it is foreseeable that nonplanar shapes could be possible. The panel 52 defines a base region 56 that surrounds the opening 54, as well as a plurality of tabs 58 that are cantilevered from the base region 56 and extend toward the opening 54, such that in combination the innermost ends 60 of the tabs 58 define the opening 54. As evident from FIG. 2, the base region 56 can be utilized to mount the device 50 to the inboard wall 46. Because of the planar configuration of the panel 52, the tabs 58 generally lie in the same plane. Eight tabs 58 are represented in FIGS. 3 and 4, though it is foreseeable that more or fewer tabs 58 could be utilized. The tabs 58 adjoin the base region 56 at what will be termed an outer perimeter 62 of an expandable orifice 64, which is defined by, in combination, the opening 54, the tabs 58 and the outer perimeter 62, that latter of which defines junctions 66 between the base region 56 and tabs 58 at which the tabs 58 are able to pivot or bend relative to the base region 56. As such, the panel 52 or at least that portion of the panel 52 defining the junctions 66 has a through-thickness that enables the tabs 58 to pivot relative to the base region 56 when subjected to a sufficiently high force or pressure, which in effect establishes a predetermined pressure level above which the opening 54 expands as a result of the tabs 58 deflecting in response to an over-pressurization condition, as represented in FIG. 4. As such, a suitable predetermined pressure level for a particular application can be arrived at by tailoring the device 60 through choices of dimensions and/or materials, as well as modeling techniques and/or limited experimentation.

The opening 54 and perimeter 62 are represented in FIGS. 3 and 4 as circular and, because they coincide with the perimeter 62, the junctions 66 between the base region 56 and tabs 58 are arcuate in shape. However, it should be appreciated that other geometric shapes are possible for the expandable orifice 64 and its elements. Also as a result of the circular shapes of the opening 54 and perimeter 62, the tabs 58 are wedge-shaped and extend radially inward toward a central axis of the opening 54, which may be parallel to the through-thickness direction of the panel 52. FIG. 3 also represents circumferentially adjacent pairs of the tabs 58 as entirely separated from each other by a gap 68, which enables the tabs 58 to deflect out-of-plane relative to the base region 56 and independently of each other. In the embodiment of FIGS. 3 and 4, the gaps 68 are located on radials of the axis of the opening 54. Finally, FIGS. 3 and 4 further show the tabs 58 as being partially delineated by peripheral gaps 70 that are disposed on the perimeter 62 of the expandable orifice 64. Each of these gaps 70 is contiguous with one of the radial gaps 68 between adjacent pairs of the tabs 58, such that the junction 66 of each tab 58 is between circumferentially-spaced pairs of the peripheral gaps 70. As represented in FIGS. 3 and 4, the junctions 66 and peripheral gaps 70 have roughly equal circumferential lengths. In practice, it is foreseeable that the circumferential lengths of the junctions 66 could be greater or less than that of the peripheral gaps 70.

As previously noted, the opening 54 of the expandable orifice 64 is operable to restrict a fluid flowing through the orifice 64 while the pressure of the fluid remains below a predetermined pressure level, and the tabs 58 are operable to deflect out of the plane of the panel 52, causing the opening 54 to increase in cross-sectional area (and diameter) to relieve an over-pressure condition if the fluid pressure were to exceed the predetermined pressure level. In addition to the thickness of the panel 52, the predetermined pressure level at which the tabs 58 will deflect depends on such factors as the relative cross-sectional areas of the opening 54 and tabs 58, the surface area of each tab 58, and the relative circumferential lengths of the junctions 66 and the peripheral gaps 70. In applications such as the anti-icing system of FIG. 1, the pressure level at which the orifice 64 is desired to expand can vary, though a threshold pressure within a range of about 0.1 to about 40 psi (about 700 Pa to about 0.3 MPa) will be typical. Under these conditions, if the panel 52 is formed of a stainless steel, for example, AISI Type 321 stainless steel, suitable thicknesses for the panel 52 will typically be in a range of about 0.04 to about 0.15 inch (about 1 to about 4 millimeters), more preferably about 0.08 to about 0.1 inch (about 2 to about 2.5 millimeters), suitable diameters for the opening 54 will typically be in a range of about 0.02 to about 1.5 inch (about 0.5 millimeters to about 4 centimeters), for example about 0.5 inch (about 0.06 millimeter), and suitable diameters for the perimeter 62 will typically be in a range of about 0.05 to about 4 inches (about 1.25 millimeters to about 10 centimeters), for example about 1.5 inches (about 4 centimeters). To ensure free movement of the tabs 58 relative to each other and relative to the base region 56, the radial and peripheral gaps 68 and 70 preferably have widths on the order of about 0.005 to about 0.045 inch (about 125 micrometers to about 1.1 millimeters).

When installed in an anti-icing system of the type represented in FIG. 1, operation of the aircraft engine 10 results in bleed air being drawn from the compressor section 18 and through the duct 32, at which point the bleed air is discharged into the D-duct 34 of the fan cowling 24 through the flow device 50. During normal operation of the engine 10, the opening 54 serves to restrict the flow of the bleed air through the expandable orifice 64 while the pressure of the bleed air remains below the predetermined pressure level established by the design of the orifice 64. In the event that the predetermined pressure level is exceeded, for example, due to a valve failure or plenum blockage within the anti-icing system, the opening 54 expands to relieve the over-pressure condition as a result of the tabs 58 being deflected relative to the base region 56. As previously noted, the radial gaps 68 enable the tabs 58 to deflect independently of each other. Deflection of the tabs 58 will typically result in plastic deformation of their junctions 66 with the base region 56, in which case the opening 54 will not return to its original cross-sectional area intended to serve as a flow restrictor. As such, it will typically be necessary to replace of the flow device 50 in the event that an over-pressure condition occurs. Due to its uncomplicated design and construction, the cost of replacing the flow device 50 will pose minimal inconvenience.

While the invention has been described in terms of a specific embodiment, other forms could be adopted by one skilled in the art. For example, the flow device 50 could be employed in applications outside the aerospace industry, the physical configuration of the flow device 50 and structures to which it is mounted could differ from what is shown in the Figures, and materials and processes other than those noted could be used to fabricate the device 50. Furthermore, the device 50 could be used in any high pressure fluid system containing essentially any type of fluid (gases and liquids) to protect against failure of an upstream pressure regulating device and avoid a burst event by relieving the pressure. Therefore, the scope of the invention is to be limited only by the following claims.

The invention claimed is:

1. A flow device mounted within a passage adapted for a fluid to flow therethrough and for an anti-icing system on an aircraft engine, the flow device comprising:
a panel having a thickness in a through-thickness direction thereof; and an expandable orifice defined in the panel, the expandable orifice comprising an outer perimeter, a plurality of cantilevered tabs surrounded by the outer perimeter and lying in a common plane, and an opening that extends through the thickness of the panel and is surrounded and defined by the cantilevered tabs, wherein each of the cantilevered tabs lies entirely in the plane and the opening has an axis parallel to the through-thickness direction of the panel, the cantilevered tabs projecting from the outer perimeter toward the opening, adjacent pairs of the cantilevered tabs being separated from each other by a gap, the gaps enabling the cantilevered tabs to deflect out of the plane thereof independently of each other, each of the cantilevered tabs defining a junction at the outer perimeter at which the cantilevered tab bends when deflected out of the plane thereof, wherein the opening is operable to restrict the fluid flowing through the expandable orifice as the fluid flows through the passage at a pressure below a predetermined pressure level, the cantilevered tabs being operable to deflect out of the plane thereof to relieve an over-pressure condition of the fluid at a pressure above the predetermined pressure level, the cantilevered tabs being entirely cantilevered within the passage so as to plastically deform at the junctions thereof while remaining cantilevered in response to the pressure within the passage being above the predetermined pressure level.

2. The flow device according to claim 1, wherein the cantilevered tabs project radially inward from the outer perimeter toward a central axis of the opening.

3. The flow device according to claim 1, wherein the gaps between the adjacent pairs of the cantilevered tabs are located on radials of an axis of the opening.

4. The flow device according to claim 1, wherein the outer perimeter of the expandable orifice has a circular shape, and the junction of each of the cantilevered tabs with the outer perimeter has an arcuate shape coinciding with the circular shape of the outer perimeter.

5. The flow device according to claim 1, further comprising peripheral gaps disposed in the outer perimeter of the expandable orifice, each of the peripheral gaps being contiguous with one of the gaps between the adjacent pairs of the cantilevered tabs, and each of the junctions of the cantilevered tabs is between adjacent pairs of the peripheral gaps.

6. The flow device according to claim 1, wherein the through-thickness of the panel is up to about 4 mm.

7. The flow device according to claim 1, wherein the panel is formed of a metallic material.

8. The flow device according to claim 1, wherein the flow device is a component of an anti-icing system installed on an aircraft engine, and the duct discharges bleed air drawn from a compressor of the aircraft engine to heat a fan cowling of the aircraft engine.

9. The anti-icing system according to claim 8.

10. An anti-icing system installed on an aircraft engine, the anti-icing system comprising:
a duct fluidically coupled to a compressor of the aircraft engine and adapted to draw bleed air from the compressor;
a cavity within a fan cowling of the aircraft engine, the cavity being fluidically coupled to the duct to receive the bleed air from the duct; and
a flow device fluidically coupled to the duct for discharging the bleed air into the cavity, the flow device comprising an expandable orifice having an outer perimeter, a plurality of cantilevered tabs surrounded by the outer perimeter and each entirely lying in a common plane, and an opening surrounded and defined by the cantilevered tabs, the cantilevered tabs projecting from the outer perimeter toward the opening, adjacent pairs of the cantilevered tabs being separated from each other by a gap, the gaps enabling the cantilevered tabs to deflect out of the plane thereof independently of each other, each of the cantilevered tabs defining a junction at the outer perimeter at which the cantilevered tab bends when deflected out of the plane thereof, wherein the opening is operable to restrict the bleed air flowing through the expandable orifice as the bleed air flows through the duct at a pressure below a predetermined pressure level, the cantilevered tabs being operable to deflect out of the plane thereof to relieve an over-pressure condition of the bleed air at a pressure above the predetermined pressure level, the cantilevered tabs being entirely cantilevered within the duct so as to plastically deform at the junctions thereof while remaining cantilevered in response to the pressure within the duct being above the predetermined pressure level.

11. The anti-icing system according to claim 10, wherein the cantilevered tabs project radially inward from the outer perimeter toward a central axis of the opening.

12. The anti-icing system according to claim 10, wherein the gaps between the adjacent pairs of the cantilevered tabs are located on radials of an axis of the opening.

13. The anti-icing system according to claim 10, wherein the outer perimeter of the expandable orifice has a circular shape, and the junction of each of the cantilevered tabs with the outer perimeter has an arcuate shape coinciding with the circular shape of the outer perimeter.

14. The anti-icing system according to claim 10, further comprising peripheral gaps disposed in the outer perimeter of the expandable orifice, each of the peripheral gaps being contiguous with one of the gaps between the adjacent pairs of the cantilevered tabs, and each of the junctions of the cantilevered tabs is between adjacent pairs of the peripheral gaps.

15. A method of inhibiting ice build-up on a fan cowling of an aircraft engine, the method comprising:
operating the aircraft engine;
drawing bleed air from a compressor of the aircraft engine; and introducing the bleed air into the fan cowling through a flow device, the flow device comprising an expandable orifice having an outer perimeter, a plurality of cantilevered tabs surrounded by the outer perimeter, and an opening surrounded and defined by the cantilevered tabs, the cantilevered tabs projecting from the outer perimeter toward the opening, wherein each of the cantilevered tabs lies entirely in a common plane and deflect out of the plane to relieve the over-pressure condition;

wherein the opening restricts flow of the bleed air through the expandable orifice at a pressure below a predetermined pressure level; and wherein the cantilevered tabs plastically deform while remaining cantilevered to cause the opening to permanently expand to relieve an over-pressure condition of the bleed air at a pressure above the predetermined pressure level as a result of the cantilevered tabs being deflected by the over-pressure condition.

16. The method according to claim 15, wherein adjacent pairs of the cantilevered tabs deflect independently of each other.

17. The method according to claim 15, wherein each of the cantilevered tabs define a junction at the outer perimeter at which the cantilevered tabs bend and plastically deform when deflected by the over-pressure condition.

18. The method according to claim 15, wherein the expandable orifice further comprises gaps between adjacent pairs of the cantilevered tabs that enable the adjacent pairs to deflect independently of each other.

* * * * *